June 30, 1970  PAUL-HENRI REBUT ET AL  3,518,474
HOMOPOLAR GENERATORS
Filed Nov. 8, 1966
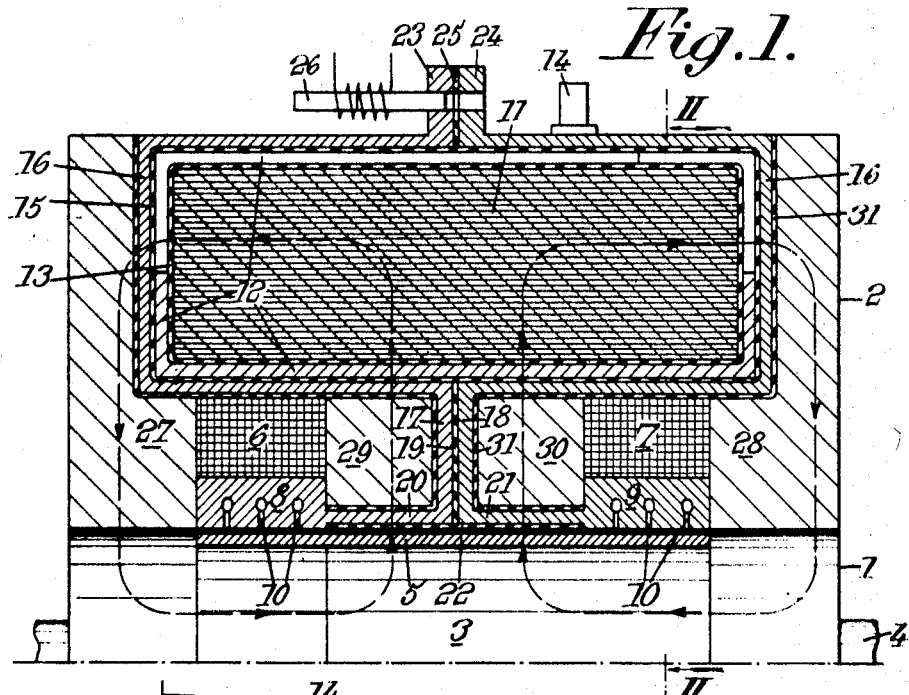
Fig.1.
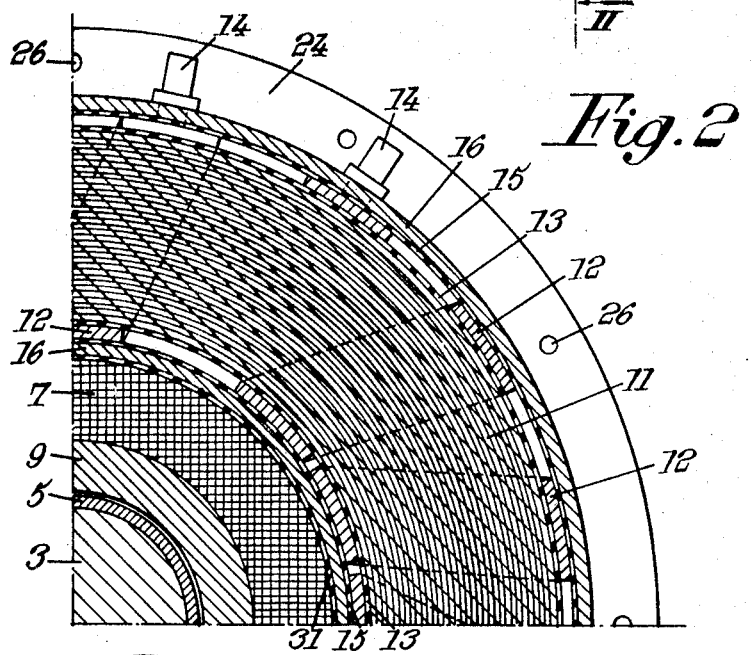
Fig.2.
Fig.3.
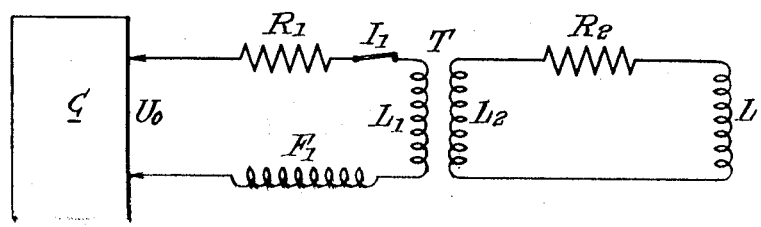
INVENTOR
PAUL-HENRI REBUT
BY William W. Stokes United States Patent Office 3,518,474
Patented June 30, 1970

3,518,474
HOMOPOLAR GENERATORS
Paul-Henri Rebut, Versailles, and Antoine Torossian,
Bourg-la-Reine, France, assignors to The Commissariat a l'Energie Atomique, Paris, France, a French organization
Filed Nov. 8, 1966, Ser. No. 592,843
Claims priority, application France, Nov. 26, 1965,
40,006
Int. Cl. H02k 31/04, 13/10
U.S. Cl. 310—178     9 Claims

ABSTRACT OF THE DISCLOSURE

The homopolar generator comprises a rotor and a stator, and is intended to deliver a very high energy pulse (e.g. several megajoules) having a duration of about one second or less. A high power step-up transformer is incorporated into the stator so that the magnetic circuit of the transformer forms part of the magnetic circuit of the stator.

---

The present invention relates to homopolar generators and it is concerned, according to an embodiment of this invention, with a homopolar generator which comprises, in combination, a rotor comprising a cylinder of a magnetic material and a sleeve of a conducting material mounted on the periphery of a portion of said cylinder, and a stator system comprising a structure forming a magnetic circuit surrounding said cylinder and having side flange portions closely surrounding portions of said cylinder located on either side of said sleeve, respectively, two field coils housed in said magnetic circuit structure, two brush forming means coaxially surrounding the end portions of said sleeve and adapted to be placed in contact therewith, a step-up transformer primary having its two ends electrically connected with said two brushes, respectively, a step-up transformer secondary adapted to cooperate with said primary, output terminals for said transformer secondary, the circuit of said primary being made of two portions not in contact with each other, and means for connecting said primary portions together.

The invention is more especially, but not exclusively, concerned with homopolar generators such as those necessary to the formation of plasmas for producing high intensity magnetic fields of a duration of the order of a second and in particular lower than a portion of a second.

The chief object of the present invention is to provide a machine of this kind which is better adapted to meet the requirements of practice than those known up to this time.

The chief feature of the present invention consist in incorporating a high power step-up transformer into the stator of the homopolar generator.

A preferred embodiment of the present invention will be hereinafter described with reference to the appended drawings, given merely by way of example, and in which:

FIG. 1 diagrammatically shows, in axial section, a homopolar generator made according to the present invention;

FIG. 2 is a part sectional view on the line II—II of FIG. 1; and

FIG. 3 is an electric diagram of the generator.

It should be remembered that homopolar generators are well known apparatus which, in a chief embodiment thereof, consist of a metal shaft or cylinder revolving in a magnetic field in such manner as to deliver between two points of said shaft a high intensity current which may reach several millions of amperes under a potential difference lower than about 100 v.

The applications relative to the creation of high intensity magnetic fields such as those necessary to the formation of plasmas require the release within a very short time, of the order of one second and less, of energy which has been previously stored. This energy may be accumulated in different ways, in particular in a battery of capacitors or in a self inductance.

The present invention relates to the release, in the form of a pulse, of electrical energy stored in the kinetic form in the rotor of a homopolar machine and which may reach several megajoules.

Up to now, the energy pulses obtained from a homopolar generator could practically not be transported, due to the low voltage that characterized them. It was therefore necessary either to place the utilization circuit (coil creating the magnetic field) in close vicinity to the generator, which involved a heavy construction, or to use the magnetic field created in the machine itself, in order for instance to form a plasma in a cavity of the stator.

With the device according to the present invention, or the contrary, energy pulses under a higher voltage are obtained which can be conveyed to the utilization circuit without involving prohibitive losses.

As it is known, a homopolar generator comprises a rotor 1 and a stator 2. The rotor comprises a cylinder 3 of a magnetic material, preferably steel, fixed on a shaft 4 and provided, over a central portion thereof, with a recess in which is fixed a cylindrical sleeve 5 of a conducting material, preferably copper. In this case, the stator, of cylindrical shape comprises two annular windings 6 and 7 centered with respect to the axis of cylinder 3 and through which currents of respective opposed directions are flowing, and also two annular brush areas 8 and 9, preferably made of copper, located opposite the ends of sleeve 5 and provided with radial channel 10 for the injection of a conducting liquid under pressure, such as mercury, in such manner as to form an electric contact between the rotor and the stator.

According to the essential feature of the present invention, a portion of the stator constitutes a transformer.

According to the essential feature of the present invention, a portion of the stator constitutes a transformer.

In the embodiment of the present invention illustrated by the drawings (FIGS. 1 and 2) the magnetic circuit of the transformer consists of a cylindrical sleeve 11 centered with respect to the axis of the rotor and the axial section of which is rectangular. Preferably, as shown by the drawings, this sleeve is constituted by a ferro-magnetic sheet iron strip insulated on both of its faces and wound about itself.

The secondary circuit of the transformer consists of conducting strip 12, preferably of copper, surrounding sleeve 11 and provided with an insulating envelope 13, so as to form $n$ turns, preferably located in a single layer (the drawings show a construction where the number of turns is about 16).

Choice of the number $n$ of turns of the secondary must be made to adapt in the best possible conditions the impedance of the utilization circuit. As a rule, this number is equal to some tens. The ends of the secondary circuit are connected to two output terminals 14, located on the outer surface of the stator, which are to be connected to the utilization circuit.

Between the turns of the secondary, there is provided a fine wire winding, not shown on the drawings, intended to polarize the magnetic circuit of the transformer.

The secondary circuit is coated with an insulating envelope 15.

The primary circuit 16 of the transformer, consisting of solid copper plates, closely surrounds the magnetic circuit of said transformer on the outside of insulating envelope 15, thus forming a hollow torus of rectangular cross section. It is connected to the annular brush areas 8 and 9 through two disc-shaped portions 17 and 18 separated from each other by an insulator 19, and two cylindrical annular portions 20 and 21 surrounding the conductor sleeve 5 of the rotor. An insulating sleeve 22 prevents short-circuiting through the conducting liquid injected through openings 10.

In order to be able to close the primary circuit 16 at the desired time, that is to say when the discharge is to be obtained in the secondary and in the utilization circuit after injection of the conductor liquid through channels 10, the external cylindrical portion of the circuit is slit along a radial plane, the edges of the slot forming two annular flange-shaped terminals 23 and 24 separated from each other by an insulating material 25. Electro magnetic contactors 26 are disposed at regular intervals along flanges 23 and 24. They are arranged so that their operation is practically simultaneous for all of them, in order to obtain a good distribution of the power about the machine.

The primary circuit works, from the electrical point of view, as a single turn circuit. An advantageous form of this circuit has been above specified. Thus, there is obtained a step-up transformer of ratio $n$.

The magnetic field created by coils 6 and 7 is closed through the magnetic circuit 11 of the transformer, two annular flanges 27 and 28 of the transformer, made of a magnetic material, preferably steel, the cylinder 3 of the rotor and two annular elements 29 and 30 of the stator, said elements being made of a magnetic material which preferably consists of steel.

The path of the magnetic field is indicated in FIG. 1 in dotted lines provided with arrows. It is radial in the rotor between brush areas 8 and 9.

The primary circuit 16 is separated from magnetic portions 27, 28, 29 and 30 and from coils 6 and 7 by an insulating material 31.

Finally, it should be noted that, being given the high rotary speed of the rotor, there may be provided a hooping of cylindrical sleeve 5 between the brush areas.

The operation of the apparatus will now be described.

The utilization circuit, for instance a coil intended to produce a high intensity magnetic field, is connected to the terminals 14 of the secondary transformer. Rotor 1 is driven at high speed by an auxiliary motor through shaft 4. The magnetic circuit of the transformer is polarized in the suitable direction and a direct current flows through coils 6 and 7 so as to create the magnetic field of the homopolar generator. A conducting liquid, such as mercury, is then injected through the channels 10 of the brush areas and, at the desired time, contactors 26 are simultaneously closed, thus closing the primary circuit while the rotor ceases to be driven. A current in one direction changing in magnitude is generated in the primary circuit. The kinetic energy of the rotor is then transformed into electrical energy and the utilization circuit receives a current pulse in one direction, creating a high intensity magnetic field, whereas the rotation of the rotor is braked and stops.

The system may be represented, from the electrical point of view by the diagram of FIG. 3, wherein the rotor of the machine has been assimilated to a capacity C loaded under voltage $U_0$, and in which, on the other hand:

T represents a transformer (without losses), the transformation ratio of which is $n$;

L is the self inductance of the utilization coil;

$L_1$ is the self inductance of the transformer primary;

$L_2$ is the self inductance of the transformer secondary;

F is the leak self inductance of the primary of the transformer;

$R_1$ is the total resistance of the primary, including the resistance of the liquid contacts between the rotor and the stator;

$R_2$ is the total resistance of the secondary; and $I_1$ is a switch intended to close the primary and corresponding to the contactors 26 of FIG. 1.

Numerical values corresponding to an embodiment of a homopolar generator according to the present invention will now be given.

(1) Rotor

Diameter: 40 cm.;
Length: 120 cm.;
Mass: 1.2 tons;
Speed of revolution: 7200 r.p.m.;

the cylindrical sleeve 5 (FIGS. 1 and 2) is made of copper and its cylindrical thickness is 2 cm.; the useful length between the two brush areas is 40 cm.

(2) Secondary circuit

Thirty-two copper turns 2 cm. thick; relative permeability of the magnetic circuit of the transformer: 100;
Self inductance $L_2$: $10^{-2}$ H;
Resistance $R_2$: of the order of $10^{-6}$ ohm;
Utilization self inductance: $2.9 \cdot 10^{-4}$ H.

(3) Primary circuit

Use is made of copper plates 2 cm. thick;
Self inductance $L_1$: $10^{-5}$ H;
Resistance $R_1$ (account being taken of the resistance of the mercury contacts): $10^{-5}$ ohm;
Leak self inductance: $10^{-7}$ H.

(4) Stator

By making use of forged steel, it is possible to obtain a value of the direct magnetic field inductance of the order of 1.5 Tesla (i.e. Webers/cm.$^2$) over the periphery of the rotor.

By polarizing, by means of the fine wire winding fed through an independent electric source, the sheets of the transformer magnetic circuit to a remanent induction of −2 Tesla, it is possible to obtain a variation of induction of 4 Tesla.

(5) Results

For a machine of a total weight of the order of 20 tons, there is obtained:

Energy stored up in the rotor: 7.9 mj.;
Voltage $U_0$ in the primary: 90 v.;
Capacity C equivalent to the rotor 1950 F.;
Collected energy: 2 mj.;
Maximum intensity of current in the rotor: $3.8 \times 10^6$ A.;
Time of formation of the pulse: 38 ms.

As above stated the transformer ratio is equal to 32 less the usual 20–30% losses.

In a general manner while we have, in the above description, disclosed what is deemed to be a practical and efficient embodiment of the present invention, said invention is not limited thereto as there might be changes made in the arrangement, disposition and form of the parts without departing from the principle of the invention as comprehended within the scope of the appended claims.

What we claim is:

1. A homopolar generator which comprises, in combination, a rotor made of a magnetic material, with a recess accommodating at least a portion of an element made of a conducting material;

a stator system comprising:

means forming a magnetic circuit, and
field coil means for producing a magnetic field in said magnetic circuit means;
two brush forming means adapted to be placed in contact with said rotor conducting element;
a step-up transformer primary having its ends electrically connected with said two brush forming means, respectively;
a step-up transformer secondary adapted to cooperate with said primary;
a transformer magnetic circuit adapted to cooperate with said primary and said secondary, said transformer magnetic circuit forming a part of the magnetic circuit means of the stator system;

output terminals for said transformer secondary; and means for suddenly completing an electrical circuit including said rotor conducting element, said brush forming means, and said primary to bring said generator into a condition of operation.

2. A homopolar generator which comprises, in combination, a rotor comprising:
 a cylinder of a magnetic material and
 a sleeve of a conducting material mounted on the periphery of a portion of said cylinder; and a stator system comprising:
 means forming a magnetic circuit about said cylinder and having side flange portions closely surrounding portions of said cylinder located on either side of said sleeve respectively, and
 two field coils housed in said magnetic circuit means;
 two brush forming means coaxially surrounding the end portions of said sleeve and adapted to be placed in contact with said sleeve;
 a step-up transformer primary having its ends electrically connected with said two brushes, respectively;
 a step-up transformer secondary adapted to cooperate with said primary;
 a transformer magnetic circuit adapted to cooperate with said primary and said secondary, said transformer magnetic circuit forming a part of the magnetic circuit means of the stator system, so that the magnetic field flux produced in the stator system passes through the transformer magnetic circuit;
 output terminals for said transformer secondary,
 the circuit of said primary made of two portions not in contact with each other, and means for connecting said primary portions together.

3. A generator according to claim 2 wherein said transformer magnetic circuit is a cylindrical toroidal sleeve coaxial with said rotor.

4. A generator according to claim 3 wherein said transformer magnetic circuit consists of a ferromagnetic metal sheet insulated on both faces thereof and wound about itself.

5. A generator according to claim 1 wherein the transformer magnetic circuit is arranged to close the magnetic field flux produced in the rest of said stator system.

6. A generator system according to claim 3 wherein said transformer secondary consists of at least one metal strip wound about said transformer magnetic circuit transversely to circular sections thereof so as to form a plurality of turns.

7. A generator according to claim 3 wherein said transformer primary consists of metal plates forming a hollow toroidal casing of rectangular axial section surrounding said transformer magnetic circuit connected to said brush forming means and including two annular flanges forming terminals on the outer periphery of said casing.

8. A generator according to claim 7 comprising contactors distributed at regular intervals along said flanges for interconnecting them when so desired.

9. A generator according to claim 2 wherein said brush forming means consist of channels for injection of conducting liquid.

References Cited

UNITED STATES PATENTS

| 2,786,155 | 3/1957 | Sellers et al. | 310—178 |
| 2,011,349 | 8/1935 | Sykes | 310—178 |
| 2,234,117 | 3/1941 | Hagedorn et al. | 323—44 |

FOREIGN PATENTS

| 864,626 | 8/1957 | Great Britain. |
| 338,519 | 7/1959 | Switzerland. |

MILTON O. HIRSHFIELD, Primary Examiner

G. P. TOLIN, Assistant Examiner

U.S. Cl. X.R.

310—219